(12) United States Patent
Yang et al.

(10) Patent No.: US 8,374,185 B2
(45) Date of Patent: Feb. 12, 2013

(54) PACKET INSPECTION DEVICE AND METHOD

(75) Inventors: Jhu-Jin Yang, Taipei (TW); Sheng-De Wang, Taipei (TW)

(73) Assignee: National Taiwan University, Taipei (TW)

( * ) Notice: Subject to any disclaimer, the term of this patent is extended or adjusted under 35 U.S.C. 154(b) by 227 days.

(21) Appl. No.: 12/414,033

(22) Filed: Mar. 30, 2009

(65) Prior Publication Data

US 2010/0195513 A1    Aug. 5, 2010

(30) Foreign Application Priority Data

Feb. 4, 2009    (TW) .............................. 98103466 A

(51) Int. Cl.
*H04L 12/56* (2006.01)
*G06F 9/34* (2006.01)

(52) U.S. Cl. ................... 370/395.32; 711/202; 711/216

(58) Field of Classification Search ................... None
See application file for complete search history.

(56) References Cited

U.S. PATENT DOCUMENTS

| | | | | |
|---|---|---|---|---|
| 6,804,240 B1 * | 10/2004 | Shirakawa et al. | ........... | 370/392 |
| 6,904,040 B2 * | 6/2005 | Salapura et al. | ......... | 370/395.32 |
| 7,006,480 B2 * | 2/2006 | Border et al. | ................. | 370/338 |
| 7,027,442 B2 * | 4/2006 | Shirakawa et al. | ........... | 370/392 |
| 7,116,664 B2 * | 10/2006 | Davis et al. | .................... | 370/392 |
| 7,324,514 B1 * | 1/2008 | Haq et al. | ...................... | 370/392 |
| 7,373,663 B2 * | 5/2008 | Robert | ............................ | 726/22 |
| 7,385,924 B1 * | 6/2008 | Riddle | ........................... | 370/235 |
| 7,554,983 B1 * | 6/2009 | Muppala | ........................ | 370/392 |
| 7,577,151 B2 * | 8/2009 | Basso et al. | ............. | 370/395.32 |
| 7,580,356 B1 * | 8/2009 | Mishra et al. | .............. | 370/230.1 |
| 7,639,613 B1 * | 12/2009 | Ghannadian et al. | ......... | 370/232 |
| 7,664,048 B1 * | 2/2010 | Yung et al. | ..................... | 370/253 |
| 7,742,406 B1 * | 6/2010 | Muppala | ........................ | 370/230 |
| 7,778,194 B1 * | 8/2010 | Yung | ............................. | 370/252 |
| 7,843,843 B1 * | 11/2010 | Papp et al. | .................... | 370/252 |
| 8,082,359 B2 * | 12/2011 | Chauhan | ....................... | 709/232 |
| 2002/0038373 A1 * | 3/2002 | Border et al. | ................ | 709/230 |

* cited by examiner

*Primary Examiner* — Gregory Sefcheck
(74) *Attorney, Agent, or Firm* — Edwards Wildman Palmer LLP; Peter F. Corless; Steven M. Jensen

(57) ABSTRACT

A packet inspection device and method for use with a packet-retrievable network apparatus are provided. The packet inspection method includes: converting header information of a packet received into a hashing function value in presence of handshaking underway at the Transmission Control Protocol (TCP) layer and comparing the hashing function value by a hashing function unit of the pending processing module, storing the hashing function value in a memory unit, and performing packet state comparison and packet screening and then creating by the session processing module a transmission connection according to the packet screened and selected by the pending processing module upon determination that data stored in the memory unit match the hashing function value resulting from conversion by the hashing function unit, thereby expediting packet inspection, reducing occupied memory space, and cutting costs.

11 Claims, 6 Drawing Sheets

PACKET INSPECTION DEVICE AND METHOD

CROSS-REFERENCE TO RELATED APPLICATION(S)

This application claims priority to Taiwanese Patent Application No. 098103466, filed on Feb. 4, 2009, the entire contents of which are incorporated by reference herein.

BACKGROUND OF THE INVENTION

1. Field of the Invention

The present invention relates to packet inspection devices and methods, and more particularly, to a packet inspection device and method for use with a packet-retrievable network apparatus to perform packet state inspection.

2. Description of the Prior Art

Transmission Control Protocol (TCP) and Internet Protocol (IP), protocols of vital importance to the Internet, enable messages to be conveyed among computers and operating environments. The messages are conveyed in the form of packets, using TCP/IP.

To transmit data by TCP, it is necessary to create a connection relation of data and TCP. The TCP layer connection starts upon transmission between two host computers a packet carrying connection control messages, inspection of TCP packet header information and state machine, sessions, and eventual connection of the sender and the receiver. Completion of connection request, connection confirmation, and connection success in sequence results in 3-way handshaking.

Quantity and complexity of attacks on the Internet is ever-increasing. The most common forms of Internet-based attacks are, namely SYN (Synchrony), SYN/ACK, and ACK (Acknowledge) DoS attack. For instance, SYN flooding attack abuses an otherwise well-functioning process: after receiving a SYN packet from the client end and then sending out a SYN/ACK packet, a server does not receive an ACK packet from the client end; the server sends the SYN/ACK packet to the client end again; and the server drops the unfinished connection after waiting for a period of time in vain. The effect of the SYN flooding attack on the process is: an overwhelmingly large number of SYN packets are sent to a server maliciously with intent to abuse the attempts undertaken by the server to maintain an extensive state of partial connection at the cost of a waste of CPU resources and memory space.

The prior art disclosed Stateful Inspection Module Architecture which involves recording the state of a packet stream, searching a packet record for data about the state of the packet stream, and determining whether an admitted packet is normal. There are three ways of data searching. First, the search is carried out from the first entry to the last entry so as to confirm presence of intended data, for example, in a linear search. Second, a tree search, for example, carrying out an AVL Tree search. Third, improvement in hardware, for example, using a supplement like a content addressable memory (CAM).

However, the prior art has the following drawbacks:

(1) Packet inspection is slow. To inspect a packet state, a record of connection is searched for by a linear search such that the time taken to carry out the search while adding a packet state and updating a packet state is proportional to that revealed in the record of connection.

(2) It occupies much memory space. A tree search is quick, but its drawback is: much memory space is occupied.

(3) It incurs high costs. Content addressable memory is conducive to quick inspection of packets and reduction of occupied memory space, but it has drawbacks, namely high costs and limited application.

Accordingly, an issue calling for an urgent solution involves providing a packet inspection device and method so as to speed up inspection of packet state, minimize occupied memory space, cut costs, and fend off malicious attacks targeted at packets on the Internet.

SUMMARY OF THE INVENTION

In light of the aforesaid drawbacks of the prior art, the present invention provides a packet inspection device for use with a packet-retrievable network apparatus. The packet inspection device comprises: a pending processing module configured for storing, comparing, and screening (to select) a packet in presence of 3-way handshaking underway at the Transmission Control Protocol (TCP) layer and comprising: a hashing function unit for converting information into a hashing function value and a memory unit for storing the hashing function value; and a session processing module for creating a transmission connection according to the packet screened and selected by the pending processing module. The packet inspection device is configured to allow header information of the packet to be converted into the hashing function value and the hashing function value to be compared by the hashing function unit, store the hashing function value in the memory unit to create a session connection upon determination that information stored in the memory unit does not match the hashing function value resulting from conversion by the hashing function unit, and perform packet state comparison and packet screening upon determination that information stored in the memory unit matches the hashing function value resulting from conversion by the hashing function unit.

The present invention also provides a packet inspection method for use with a packet inspection device having a pending processing module and a session processing module. The packet inspection method comprises the steps of: (1) converting header information of a packet received into a hashing function value in presence of handshaking underway at the Transmission Control Protocol (TCP) layer and comparing the hashing function value by a hashing function unit of the pending processing module, going to step (2) upon determination that data stored in a memory unit do not match the hashing function value resulting from conversion by the hashing function unit, and going to step (3) upon determination that data stored in the memory unit match the hashing function value resulting from conversion by the hashing function unit; (2) creating a session connection by the pending processing module and then going back to step (1) to inspect the next packet; (3) comparing the packet with a state of the session connection corresponding to the packet, dropping the packet upon determination of absence of a match for the state, and going to step (4) upon determination of presence of a match for the state; and (4) allowing the pending processing module to go on handshaking or the packet to be sent to the session processing module so as to create a transmission connection.

In a preferred embodiment, the step (1) further comprises: (1-1) converting the header information of the packet into an address value by a hashing function; (1-2) converting the header information of the packet into a key value by a hashing function; and (1-3) comparing information in the address value with the key value of the packet, storing the key value of the packet in the address value upon determination of absence of a match, and performing packet state comparison and packet screening upon determination of presence of a match.

Unlike the prior art, the present invention teaches converting header information of a packet into hashing function values by a hashing function unit of a pending processing module of the packet inspection device, comparing the hashing function values with the memory unit of the pending processing module, comparing the hashing function values with the state of the session connection corresponding to the packet, and creating by means of the session processing module a transmission connection according to the packet screened and selected by the pending processing module, so as to fend off malicious attacks against packets on the Internet.

Accordingly, the packet inspection device and method of the present invention increase packet state inspection speed, reduce occupied memory space, and cut costs, thereby overcoming the drawbacks of the prior art in packet inspection.

DETAILED DESCRIPTION OF THE EMBODIMENTS

The present invention is herein illustrated with specific embodiments, so that one skilled in the pertinent art can easily understand other advantages and effects of the present invention from the disclosure of the invention.

The preferred embodiments below are to further expound on the viewpoints about the present invention but are not to impose limitation on the scope of the present invention from any viewpoint.

Figure 1:
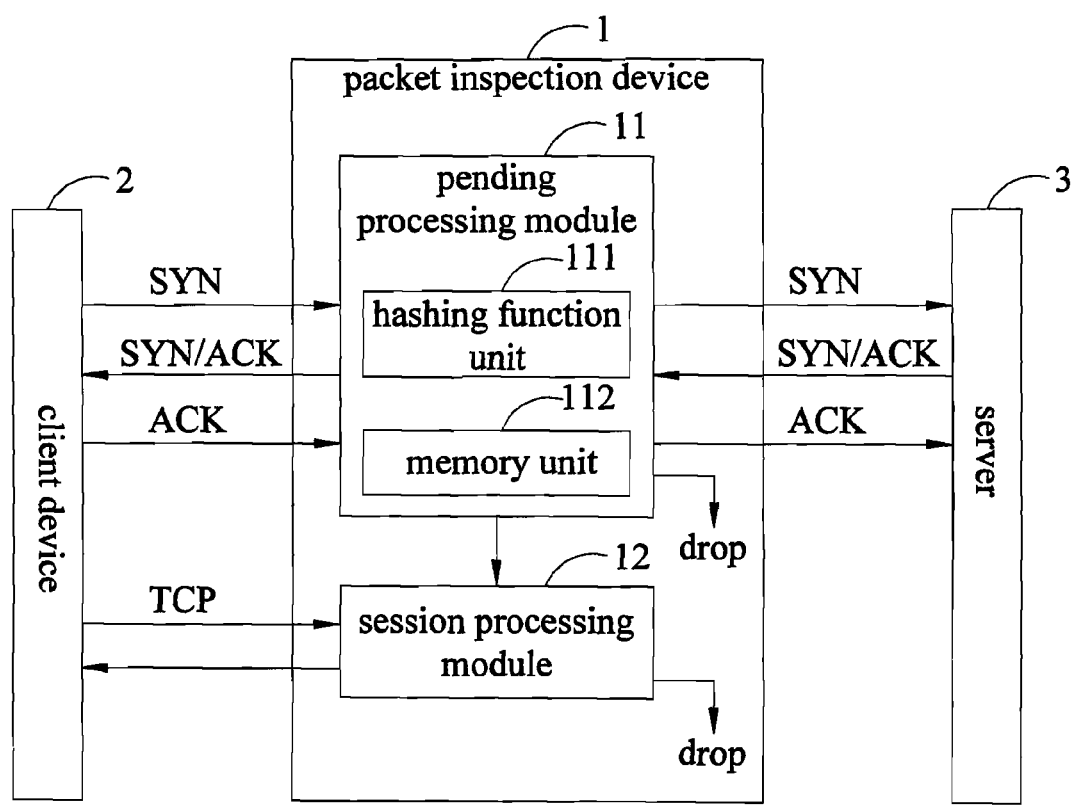
FIG. 1 is a schematic view of a packet inspection device of the present invention.

Referring to FIG. 1, which is a schematic view of a packet inspection device of the present invention, a packet inspection device 1 is installed on a packet-retrievable network apparatus (not shown), wherein the network apparatus functions as a means of connecting a computer and the Internet. In the present preferred embodiment, a client device 2 and a server 3 are connected to the Internet via the network apparatus, and the network apparatus is exchange equipment, transmission equipment, broadband access equipment, local network equipment, broadband network application equipment, and/or a client device.

The client device is a modem. The cable local network equipment is an NIC or a hub. The exchange equipment is a switch or a router.

The packet inspection device 1 of the present invention comprises a pending processing module 11 and a session processing module 12.

The pending processing module 11 is configured for storing, comparing, and screening (to select) a packet while 3-way handshaking is underway at the Transmission Control Protocol (TCP) layer.

The session processing module 12 is configured for creating a transmission connection according to a packet screened and selected by the pending processing module 11.

The pending processing module 11 further comprises a hashing function unit 111 and a memory unit 112.

The hashing function unit 111 is configured for converting information into a plurality of hashing function values.

The memory unit 112 is configured for storing the hashing function values.

In practice, after receiving a SYN packet from a client device 2, the pending processing module 11 determines, using an access control list (ACL) (not shown), whether to accept the SYN packet, and drops the SYN packet upon a negative determination. After acceptance of the SYN packet following an affirmative determination, header information of the SYN packet is converted into the hashing function values by the hashing function unit 111, and then the hashing function values are compared. Upon determination that the hashing function values in the memory unit 112 are unmatched, the SYN packet is stored in the memory unit 112 so as to create a session connection. Upon determination of the presence of a match of the hashing function values in the memory unit 112, the SYN packet is sent to the server 3, and the status of the connection is refreshed to await a SYN/ACK packet.

After the pending processing module 11 has received the SYN/ACK packet from the server 3, header information of the SYN/ACK packet is converted into the hashing function values by the hashing function unit 111, and then hashing function values are compared. Upon determination that the hashing function values in the memory unit 112 are unmatched, the SYN/ACK packet is dropped. Upon determination of the presence of a match of the hashing function values in the memory unit 112, the SYN/ACK packet is sent to the client device 2, and the status of the connection is refreshed to await an ACK packet.

After the pending processing module 11 has received the ACK packet from the client device 2, header information of the ACK packet is converted into the hashing function values by the hashing function unit 111, and then the hashing function values are compared. Upon determination of the absence of a match of the hashing function values in the memory unit 112, the ACK packet is dropped. Upon determination of the presence of a match of the hashing function values in the memory unit 112, the ACK packet is sent to the session processing module 12 so as to create a transmission connection, and the ACK packet is removed from the session processing module 12 as soon as transmission at the TCP layer ends.

If the timestamp taken to perform comparison exceeds a threshold, packets processed overtime will be removed and replaced with new packets.

Figure 2A:
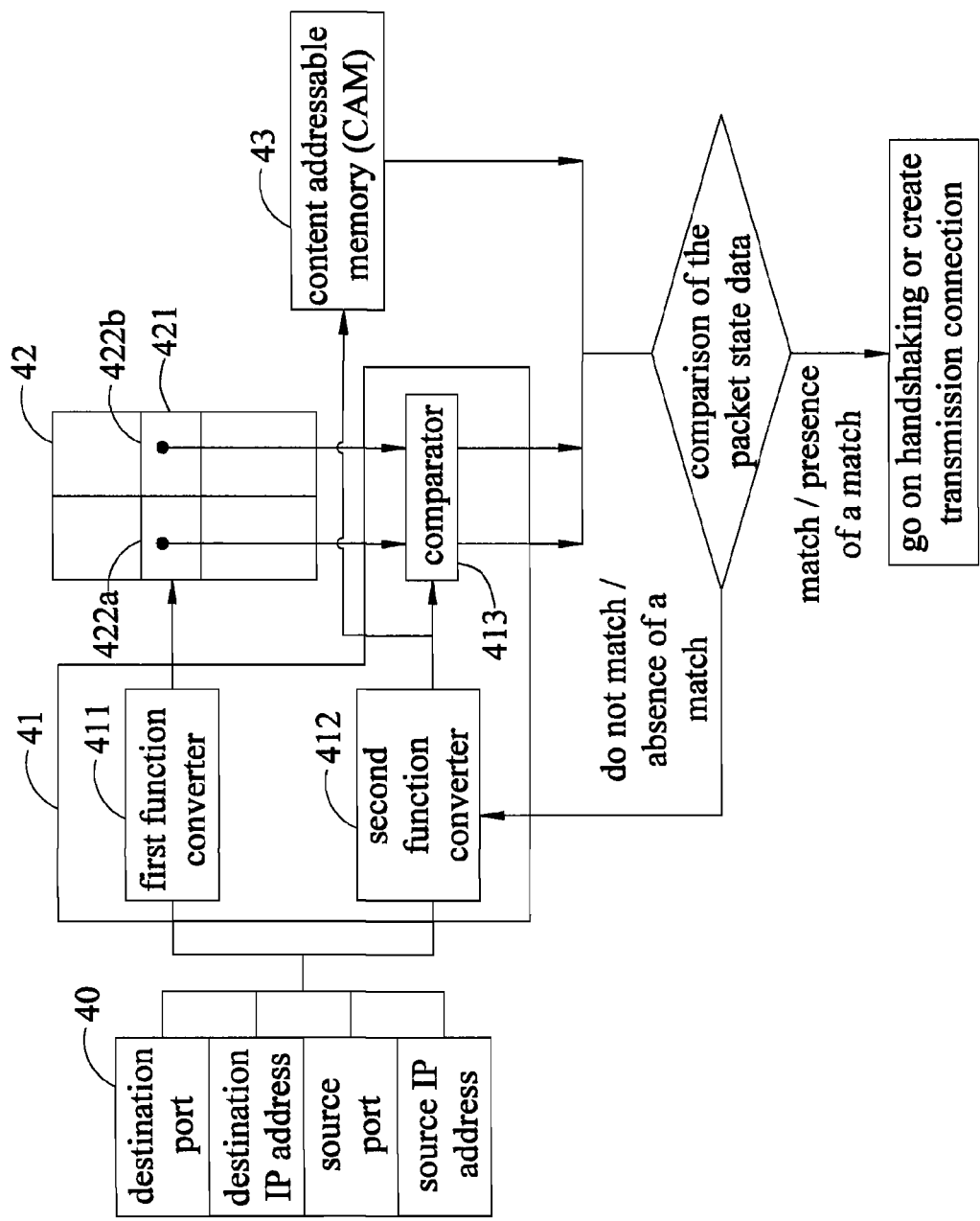
FIG. 2A is a schematic view of comparison of a hashing function value by a hashing function unit and a memory unit of the packet inspection device according to the present invention.

Referring to FIG. 2A, which is a schematic view of comparison of a hashing function value by a hashing function unit and a memory unit of the packet inspection device according to the present invention, a hashing function unit 41 comprises a first function converter 411, a second function converter 412 and a comparator 413, and a memory unit 42 is configured for storing an address value 421 and information 422a, 422b in the address value 421. The information 422a and the information 422b are different from each other, and each entry of the information relates to a packet connection record.

Header information 40 of the packet is a source IP address, a source port, a destination IP address, or a destination port.

The first function converter 411 converts header information 40 of the packet into the address value 421 by a hashing function.

The second function converter 412 converts header information 40 of the packet into key values by another hashing function.

The comparator 413 retrieves the information 422a, 422b in the address value 421 from the memory unit 42, compares the retrieved information 422a, 422b with the key values of the packet in sequence, incorporates a corresponding one of the key values into the address value 421 upon determination of the absence of a match, and performs packet state comparison and packet screening upon determination of the presence of a match.

The packet inspection device of the present invention further comprises a content addressable memory (CAM) 43 for storing the key values of the packet whenever the address value 421 of the memory unit 42 is full.

In a preferred embodiment, the first function converter 411 converts header information 40 of a packet into the address value 421 as soon as the pending processing module receives the packet. Then, the second function converter 412 converts the header information 40 of the packet into key values. Afterward, the comparator 413 searches the memory unit 42 and finds the address value 421 that matches the packet, and then the comparator 413 compares the key values of the packet with the information 422a, 422b in the address value 421. The key values of the packet are incorporated into the address value 421 upon determination that one of the information 422a and the information 422b is empty and the other does not have a match. The key values of the packet are stored in the content addressable memory 43 so as to wait for the next packet upon determination that no match is found and both of the information 422a and the information 422b are full. Upon determination that one of the information 422a and the information 422b matches the key values of the packet, comparison of the packet state begins. Upon determination of the presence of a match for the packet state, the pending processing module goes on handshaking or the packet is sent to the session processing module to allow a transmission connection to be created. Upon determination of the absence of a match for the packet state, the packet is dropped.

The packet state is compared by state tracking, packet time to live (TTL) tracking, sequence tracking, and/or acknowledge tracking.

Figure 2B:
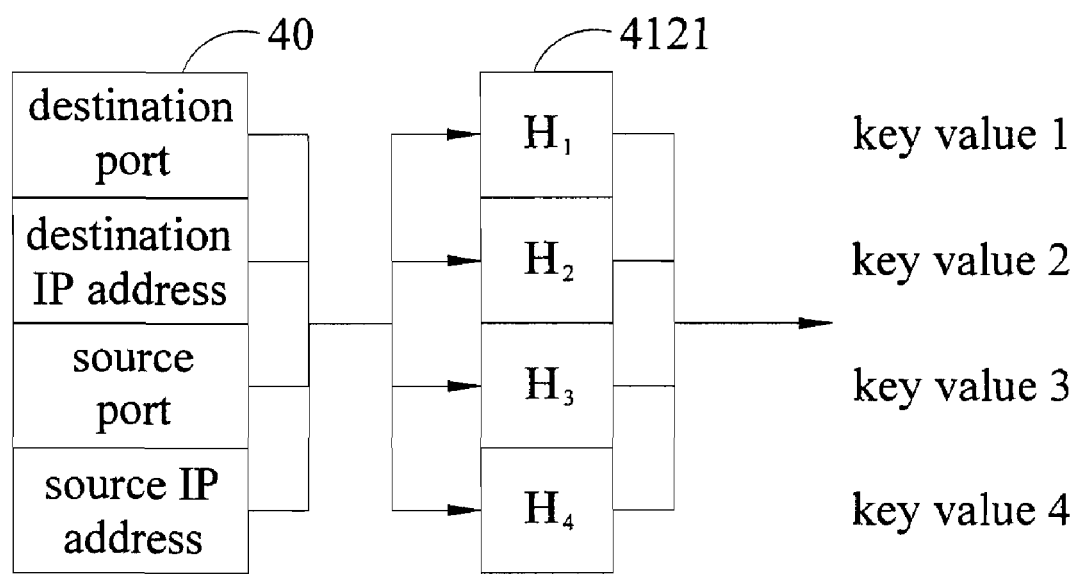
FIG. 2B is a schematic view of conversion of key values by hashing function components of the packet inspection device according to the present invention.

Referring to FIG. 2B, which is a schematic view of conversion of key values by hashing function components of the packet inspection device according to the present invention, in a preferred embodiment of the packet inspection device of the present invention, a second function converter 412 further comprises a plurality of hashing function components 4121 for converting header information 40 of a packet into key values by a plurality of hashing functions $H_1$ to $H_4$.

In practice, once the pending processing module receives a packet, the first function converter 411 will convert header information 40 of the packet into the address value 421, and the hashing function components 4121 convert the header information 40 of the packet into key value 1 through key value 4 by the hashing functions $H_1$ to $H_4$.

Afterward, the comparator 41 searches the memory unit 42 and finds the address value 421 that matches the address value 421 of the packet, and retrieves the information 422a and the information 422b in the address value 421 for further comparison.

A key value 1 of the packet is compared with the first entry of data in the information 422a and the first entry of data in the information 422b. Comparison of the packet state data begins when a match is found. If no match is found, the key values of the packet are incorporated into the address value 421 or stored in the content addressable memory 43 when the address value 421 is full. Upon determination of the presence of a match for the packet state, handshaking continues or a transmission connection is created. Upon determination of the absence of a match for the packet state, a key value 2 of the packet is compared with the second entry of data of the information 422a and the second entry of data of the information 422b. The follow-up is effectuated by analogy, until comparison of a key value 4 is done, and the packet is dropped upon determination that the packet state does not have a match.

Owing to independence of the hashing functions $H_1$ through $H_4$, the same packet does not yield the same address value 421 using different hashing functions, but different packets may yield the same address value 421 using the same hashing function. Hence, a plurality of information 422a~422b are provided in the address value 421 of the memory unit 42 of the present invention and each relates to a packet record for comparison of the key values of the packet, so as to decrease the chance of creating a connection in vain when mapping different packets to the same said address value 421. A plurality of entries of data (not shown) are provided in information 422 of the address value 421 such that, upon successful comparison of the key value 1 of the packet and failure to find a match by the packet state comparison, the key value 2 of the packet is retrieved and compared with the information 422 again so as to reduce the chance of creating a connection in vain, and in consequence the packet inspection device of the present invention speeds up packet inspection and reduces occupied memory space. On the other hand, high speed and low costs of packet inspection are achievable according to the present invention, for the following reason. The packet inspection device of the present invention is provided with the content addressable memory 43. The content addressable memory 43 enables quick comparison of hashing function values and yet incurs high costs. To cut costs, the present invention teaches storing key values of a packet only when the address value 421 of the memory unit 42 is full and searching the content addressable memory 43 only when the key values of the memory unit 42 are searched and found to be unmatched.

Figure 3A:
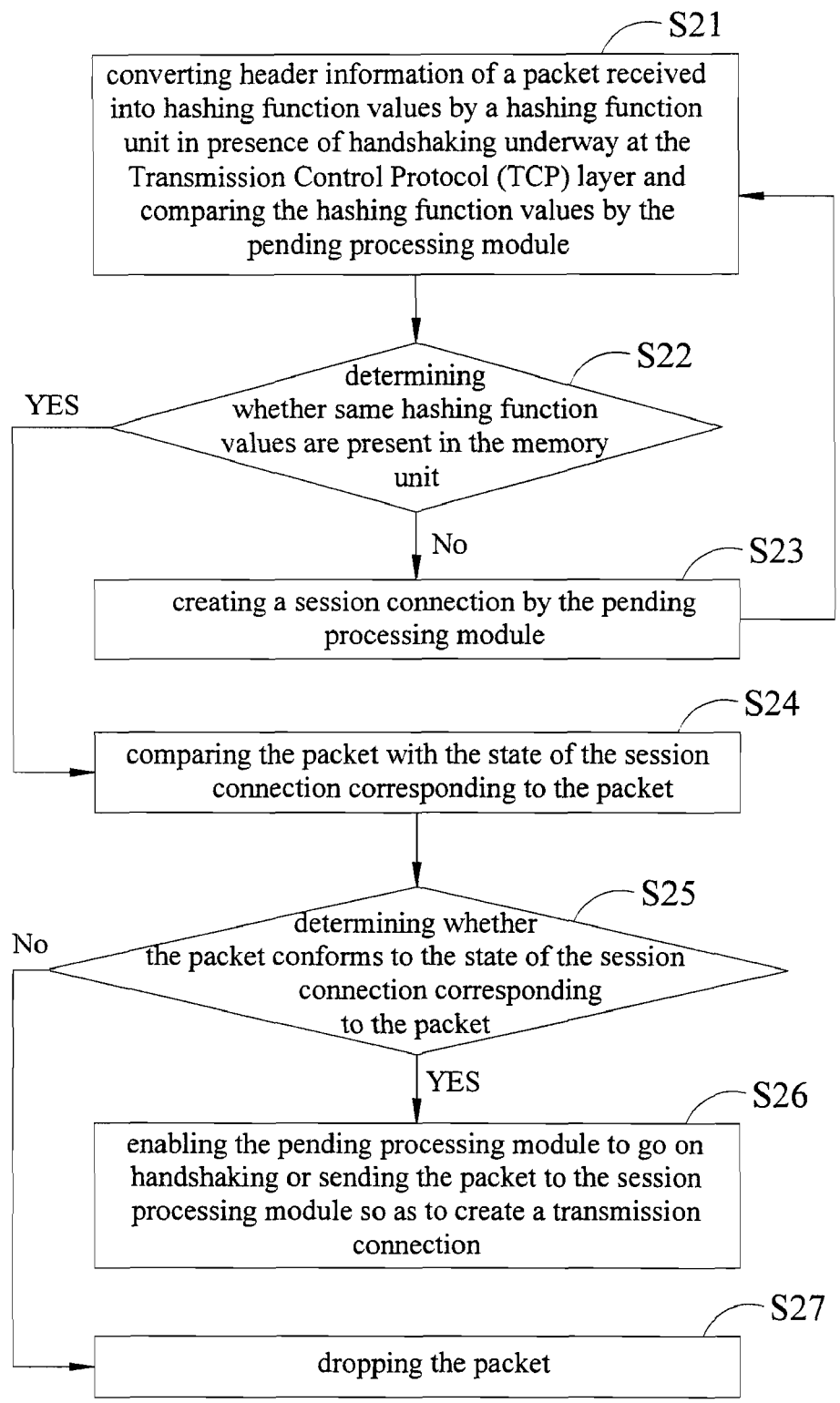
FIG. 3A is a flowchart of a packet inspection method of the present invention.

Referring to FIG. 3A, which is a flowchart of a packet inspection method of the present invention, the packet inspection method is for use with a packet inspection device having a pending processing module and a session processing module.

As shown in the drawing, the packet inspection method comprises the following steps:

Step S21 involves converting header information of a packet received into hashing function values by a hashing function unit in the presence of handshaking underway at the Transmission Control Protocol (TCP) layer and comparing the hashing function values by the pending processing module, wherein the hashing function values are an address value and a key value. Go to step S22.

Step S22 involves determining whether same said hashing function values are present in the memory unit. Upon a negative determination, go to step S23, otherwise go to step S24.

Step S23 involves creating a session connection by the pending processing module and then going back to step S21 to inspect the next packet.

Step S24 involves comparing the packet with the state of the session connection corresponding to the packet and then going to step S25.

Step S25 involves determining whether the packet conforms to the state of the session connection corresponding to the packet, and going to step S26 upon an affirmative determination, otherwise go to step S27.

Step S26 involves enabling the pending processing module to go on handshaking or sending the packet to the session processing module so as to create a transmission connection, and removing the packet from the session processing module as soon as transmission at the TCP layer ends.

Step S27 involves dropping the packet.

Figure 3B:
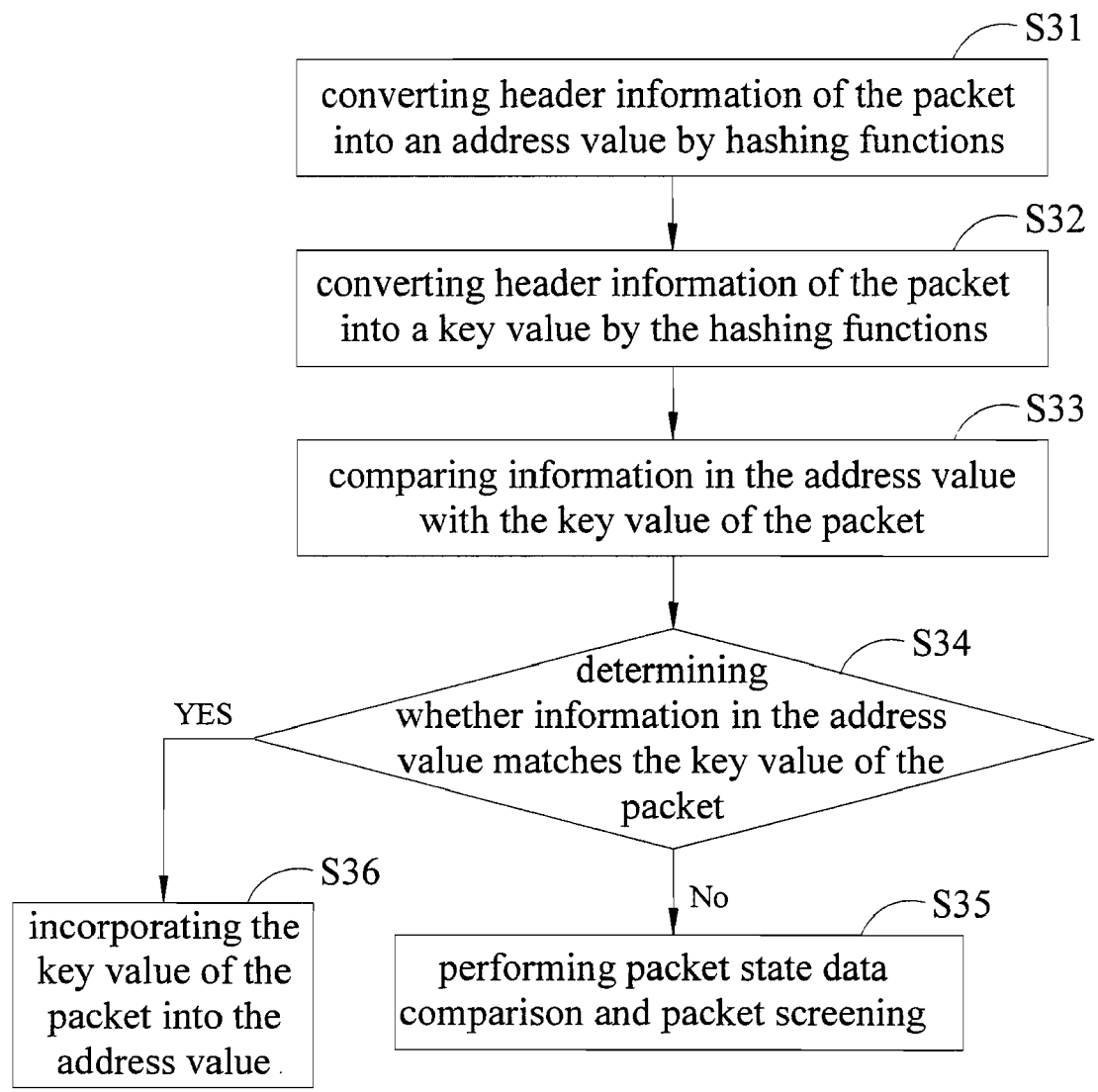
FIG. 3B is a flowchart of the comparison of the hashing function value by the packet inspection method of the present invention.

FIG. 3B is a flowchart of the comparison of the hashing function values by the packet inspection method of the present invention, and more particularly, is a flowchart of further details of the aforesaid steps S21 and S22.

Step S31 involves converting header information of the packet into an address value by hashing functions and then going to step S32.

Step S32 involves converting header information of the packet into a key value by the hashing functions and then going to step S33.

Step S33 involves comparing information in the address value with the key value of the packet and then going to step S34.

Step S34 involves determining whether information in the address value matches the key value of the packet, going to step S35 upon an affirmative determination, and going to step S36 upon a negative determination.

Step S35 involves performing packet state data comparison and packet screening.

Step S36 involves incorporating the key value of the packet into the address value.

The description of the preferred embodiments reveals that, with the packet inspection method of the present invention, header information of packets is converted into address values and key values by hashing functions to facilitate quick comparison in the memory unit, so as to speed up packet inspection, minimize occupied memory space, and fend off malicious attacks against packets on the Internet.

Figure 4:
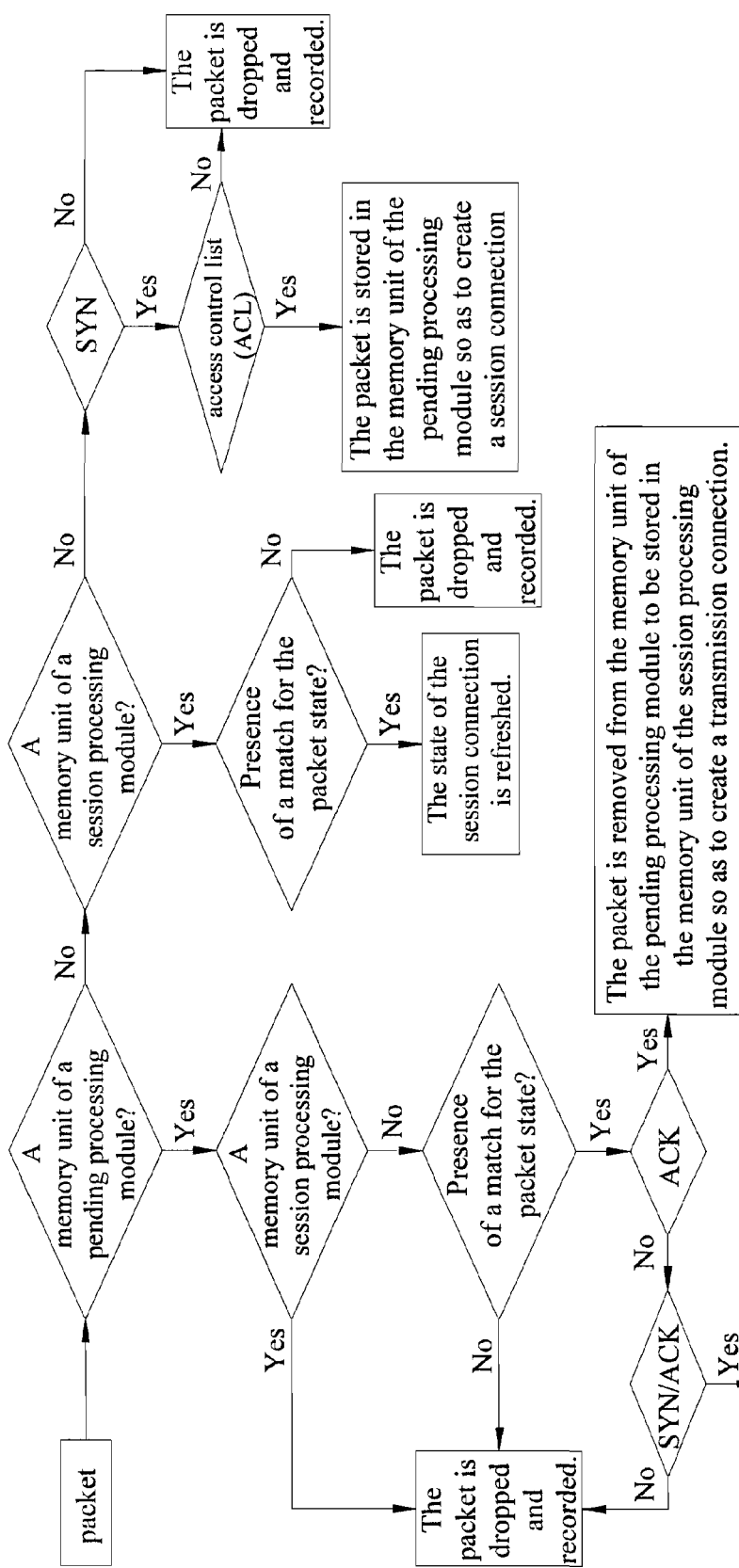
FIG. 4 is a flowchart of a preferred embodiment of the packet inspection device and method of the present invention.

Referring to FIG. 4, which is a flowchart of a preferred embodiment of the packet inspection device and method of the present invention, in the present preferred embodiment, the packet inspection device is configured for use with a packet-retrievable network apparatus, so as to store, compare, and screen (to select) a packet as soon as the packet enters the packet inspection device comprising the pending processing module and the session processing module.

Once the packet inspection device of the present invention receives a packet, header information of the packet is converted into an address value and a key value such that the address value of the memory unit of the pending processing module is identified, and then information in the address value is compared. Upon determination that the memory unit of the pending processing module does not provide a match for information in the packet, comparison takes place in the session processing module again. Upon determination of absence of a match for information in the packet, judgment is made as to whether the packet is a SYN packet. Upon a negative determination, the packet is dropped and recorded. Upon an affirmative determination, judgment is made as to whether the packet should be accepted according to an access control list (ACL) (not shown). The unaccepted packet is dropped and recorded. The accepted packet is stored in the memory unit of the pending processing module so as to create a session connection. If the packet inspection device of the present invention receives a SYN packet and yet a handshaking session corresponding to the packet is underway in the memory unit of the pending processing module, the packet will be dropped and recorded.

Upon determination that information corresponding to the packet is present in the memory unit of the pending processing module, comparison takes place in the memory unit of the session processing module again. Upon determination that information corresponding to the packet is present in the memory unit of the session processing module, the packet is dropped and recorded. Upon determination that information corresponding to the packet is absent from the memory unit of the session processing module, a packet state comparison begins. If the comparison does not yield a match, the packet will be dropped and recorded. If the comparison yields a match, options, namely the packet being a SYN/ACK packet or the packet being an ACK packet will be assessed. Upon determination that none of the options is available, the packet is dropped and recorded. Upon determination that only the option the packet being a SYN/ACK packet is available, the pending processing module goes on handshaking. Upon determination that only the option the packet being an ACK packet is available, the packet is removed from the memory unit of the pending processing module to be stored in the memory unit of the session processing module so as to create a transmission connection.

Upon determination of absence of information corresponding to the packet from the memory unit of the pending processing module but present of information corresponding to the packet in the memory unit of the session processing module, a packet state comparison begins. If the comparison yields a match, the state corresponding to the session connection of the packet is refreshed. If the comparison does not yield a match, the packet will be dropped and recorded.

Hence, the packet inspection device and method have the following effects:

(1) Increase of packet inspection speed. Header information of a packet is converted into address values and key values by hashing functions and then compared with information of a memory, so as to speed up packet inspection and thereby solve a drawback of the prior art, that is, time-consuming linear comparison.

(2) Reduction of occupied memory space. With hashing functions, header information of packets is converted into address values and key values for comparison and thereby solve a drawback of the prior art, that is, memory space-consuming tree comparison.

(3) Reduction of costs. With hashing functions, header information of packets is converted into address values and key values for comparison so as to store a packet state and create connection, and key values of packets are stored in a content addressable memory only when the memory unit of the pending processing module is full, thereby solving a drawback of the prior art, that is, a pricey content addressable memory functions as the primary memory.

The foregoing specific embodiments are only illustrative of the features and functions of the present invention but are not intended to restrict the scope of the present invention. It is apparent to those skilled in the art that all equivalent modifications and variations made in the foregoing embodiments according to the spirit and principle in the disclosure of the present invention should fall within the scope of the appended claims.

What is claimed is:

1. A packet inspection device comprising a computer readable medium containing program codes to control the packet inspection device for:

storing, comparing, and screening to select a packet in presence of 3-way handshaking underway at the Transmission Control Protocol (TCP) layer, for converting information into a hashing function value, and for storing the hashing function value, so as to allow header information of the packet to be converted into the hashing function value and the hashing function value to be compared and stored to create a session connection upon determining that information stored does not match the hashing function value resulting from the conversion, and perform packet state comparison and packet screening upon determining that information stored matches the hashing function value resulting from the conversion; and creating a transmission connection according to the screened packet, wherein the program codes further control the packet inspection device for:

converting the header information of the packet into an address value;

converting the header information of the packet into key values; and retrieving information in the address value, comparing the information in the address value with the key values of the packet in sequence, incorporating a corresponding one of the key values into the address value upon determination of absence of a match, and performing the packet state comparison and packet screening upon determination of presence of a match, wherein a plurality of hashing functions are provided for converting the same header information of the packet into the key values, and the address value has a plurality of information that are comparable with the key values of the packet that are converted from the header information of the packet by the hashing functions, wherein each of the plurality of information relates to a packet record for comparison of the key values of the packet, so as to decrease a chance of creating a connection in vain when mapping different packets to the same address value, and the key values are created by the plurality of hashing functions based on one header information of the packet.

2. The packet inspection device of claim 1, wherein the packet state is compared by state tracking, packet time to live (TTL) tracking, sequence tracking, or acknowledge tracking.

3. The packet inspection device of claim 1, wherein the packet inspection device performs packet screening according to a result of the packet state comparison, drops the packet upon determination of absence of a match for the packet state, and goes on handshaking or sends the packet so as to create a transmission connection upon determination of presence of a match for the packet state.

4. The packet inspection device of claim 3, wherein the packet state is compared by state tracking, packet time to live (TTL) tracking, sequence tracking, or acknowledge tracking.

5. The packet inspection device of claim 1, wherein 3-way handshaking is performed according to received SYN packet, SYN/ACK packet, or ACK packet.

6. The packet inspection device of claim 1, wherein the key values of the packet are stored in a content addressable memory (CAM) whenever the information in the address value is full.

7. The packet inspection device of claim 6, wherein information of the content addressable memory is in comparison upon determination of absence of a match for the hashing function value of the address value and the key values of the packet.

8. The packet inspection device of claim 1, wherein the header information of the packet is one selected from the group consisting of a source IP address, a source port, a destination IP address, and a destination port.

9. A packet inspection method for use with a packet inspection device having a pending processing module and a session processing module, the packet inspection method comprising the steps of:

(1) converting header information of a packet received into a hashing function value in presence of handshaking underway at the Transmission Control Protocol (TCP) layer and comparing the hashing function value by a hashing function unit of the pending processing module, going to step (2) upon determination that data stored in a memory unit do not match the hashing function value resulting from conversion by the hashing function unit, and going to step (3) upon determination that data stored in the memory unit match the hashing function value resulting from conversion by the hashing function unit;

(2) creating a session connection by the pending processing module and then going back to step (1) to inspect the next packet;

(3) comparing the packet with a state of the session connection corresponding to the packet, dropping the packet upon determination of absence of a match for the state, and going to step (4) upon determination of presence of a match for the state; and (4) allowing the pending processing module to go on handshaking or the packet to be sent to the session processing module so as to create a transmission connection, wherein step (1) further comprises: (1-1) converting the header information of the packet into an address value by a hashing function; (1-2) converting the header information of the packet into a key value by a hashing function; and (1-3) comparing information in the address value with the key value of the packet, storing the key value of the packet in the address value upon determination of absence of a match, and performing packet state comparison and packet screening upon determination of presence of a match, wherein the step (1-2) further comprises converting the same header information of the packet into a plurality of said key values by a plurality of said hashing functions, wherein the address value has a plurality of information that are comparable with the key values of the packet that are converted from the header information of the packet by the hashing functions, and wherein each of the plurality of information relates to a packet record for comparison of the key values of the packet, so as to decrease a chance of creating a connection in vain when mapping different packets to the same address value, and the key values are created by the plurality of hashing functions based on one header information of the packet.

10. The packet inspection method of claim 9, further comprising the step of storing the key value of the packet in a content addressable memory when information in the address value of the memory unit is full.

11. The packet inspection method of claim 9, wherein the header information of the packet is one selected from the group consisting of a source IP address, a source port, a destination IP address, and a destination port.

\* \* \* \* \*